United States Patent
Nguyenvan

(10) Patent No.: US 9,672,455 B2
(45) Date of Patent: Jun. 6, 2017

(54) IMAGE READING APPARATUS THAT OUTPUTS ONE OR MORE FILES IN WHICH IS STORED GENERATED IMAGE DATA

(71) Applicant: Brother Kogyo Kabushiki Kaisha, Nagoya-shi, Aichi-ken (JP)

(72) Inventor: Thanh Nguyenvan, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/083,597

(22) Filed: Mar. 29, 2016

(65) Prior Publication Data
US 2016/0292548 A1  Oct. 6, 2016

(30) Foreign Application Priority Data

Mar. 31, 2015 (JP) ................. 2015-072609

(51) Int. Cl.
| | |
|---|---|
| *G06K 15/00* | (2006.01) |
| *H04N 1/00* | (2006.01) |
| *H04N 1/04* | (2006.01) |
| *G06K 15/02* | (2006.01) |
| *H04N 1/23* | (2006.01) |
| *H04N 1/32* | (2006.01) |

(52) U.S. Cl.
CPC ..... *G06K 15/1868* (2013.01); *H04N 1/00798* (2013.01); *H04N 1/00811* (2013.01); *H04N 1/2338* (2013.01); *H04N 1/32475* (2013.01); *H04N 2201/0094* (2013.01)

(58) Field of Classification Search
CPC .......... G06K 15/1868; H04N 1/00798; H04N 1/00811; H04N 1/2338; H04N 1/32475

USPC .... 358/468, 474, 442, 1.15, 1.13, 1.16, 403, 358/496
See application file for complete search history.

(56) References Cited

U.S. PATENT DOCUMENTS

| | | | |
|---|---|---|---|
| 8,804,144 B2 | 8/2014 | Tsuya | |
| 2003/0184803 A1* | 10/2003 | Yamada | H04N 1/33307 358/1.16 |
| 2005/0141044 A1 | 6/2005 | Morita | |
| 2010/0245879 A1 | 9/2010 | Tsuya | |

(Continued)

FOREIGN PATENT DOCUMENTS

| | | |
|---|---|---|
| JP | 2005-167938 A | 6/2005 |
| JP | 2010-259061 A | 11/2010 |

*Primary Examiner* — Cheukfan Lee
(74) *Attorney, Agent, or Firm* — Banner & Witcoff, Ltd.

(57) ABSTRACT

When acquired information contains setting information indicating to output first format file, a first output process is executed, wherein a reading process is performed and an inquiry is executed as to whether to continue reading. Every time when receiving an instruction to continue reading, a reading process is performed and the inquiry is executed. A first format file, in which is stored image data that has been generated until when an instruction not to continue reading is received, is outputted. When the acquired information contains setting information to output second format file, a second output process is executed, wherein a reading process is performed, and one or more second format files, whose number is equal to a number of sets of image data generated through the reading process, is outputted such that each set of image data is stored in a corresponding second format file.

9 Claims, 8 Drawing Sheets

(56) References Cited

U.S. PATENT DOCUMENTS

2012/0127544 A1* 5/2012 Morita ............... H04N 1/00217
　　　　　　　　　　　　　　　　　　　　　　358/498
2012/0162711 A1* 6/2012 Shibao ............... H04N 1/00217
　　　　　　　　　　　　　　　　　　　　　　358/1.15
2012/0162712 A1* 6/2012 Shibao ............... H04N 1/00217
　　　　　　　　　　　　　　　　　　　　　　358/1.15
2013/0250348 A1* 9/2013 Ugai .................. H04N 1/00225
　　　　　　　　　　　　　　　　　　　　　　358/1.15
2015/0207945 A1* 7/2015 Odaira ............... H04N 1/00217
　　　　　　　　　　　　　　　　　　　　　　358/1.15

* cited by examiner

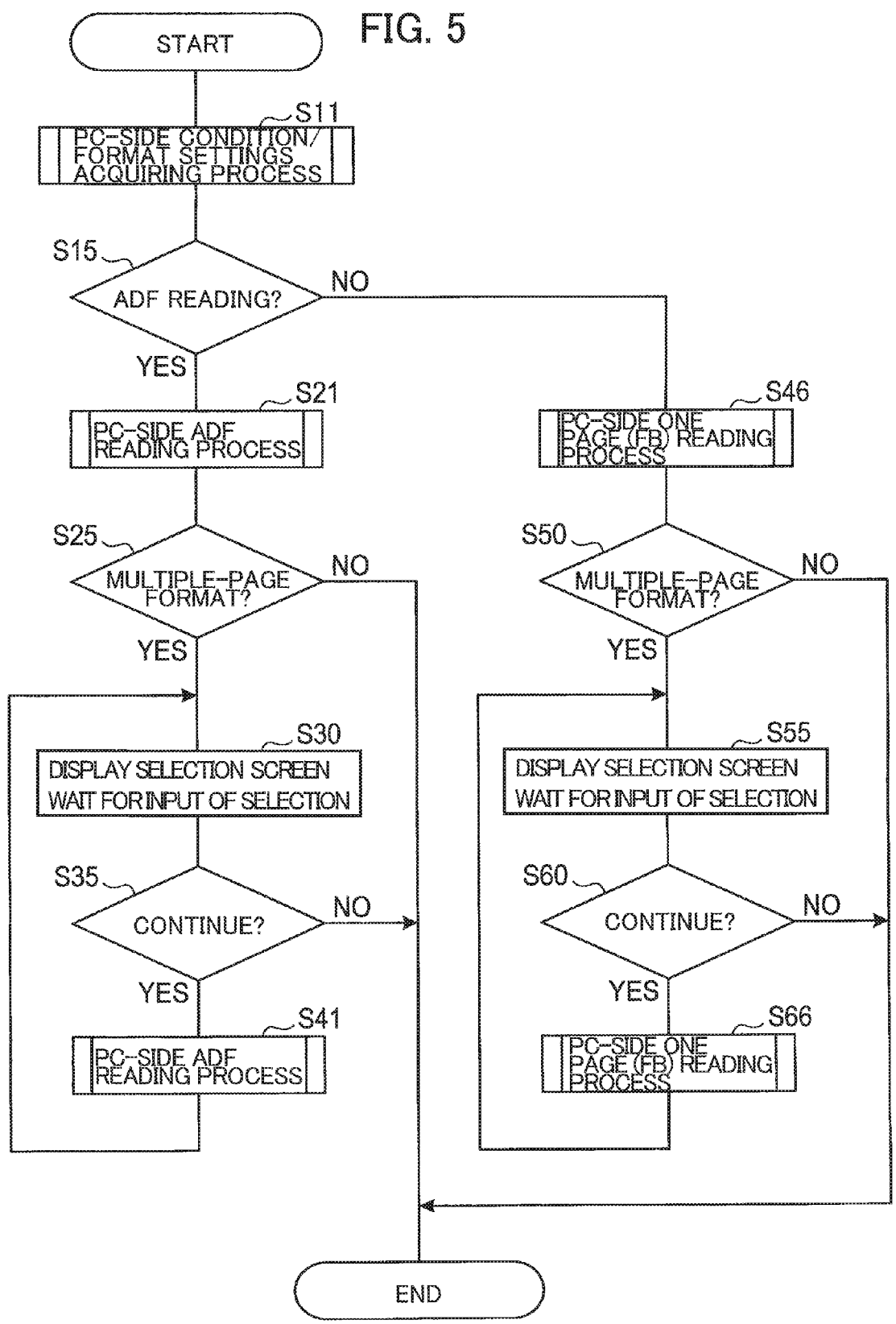

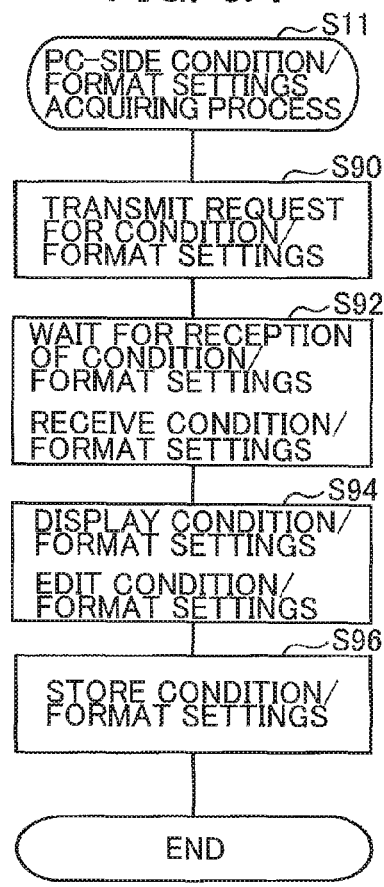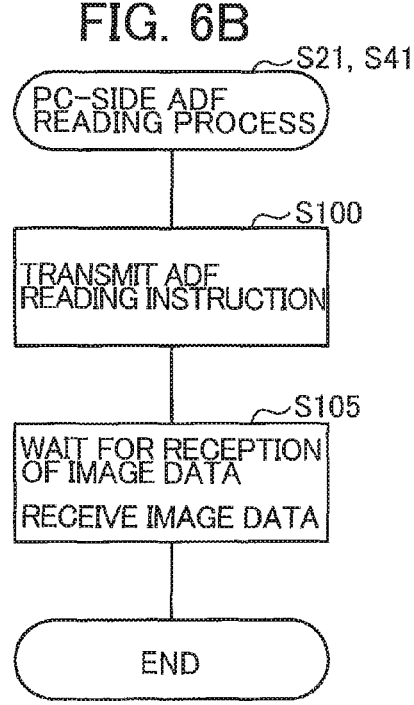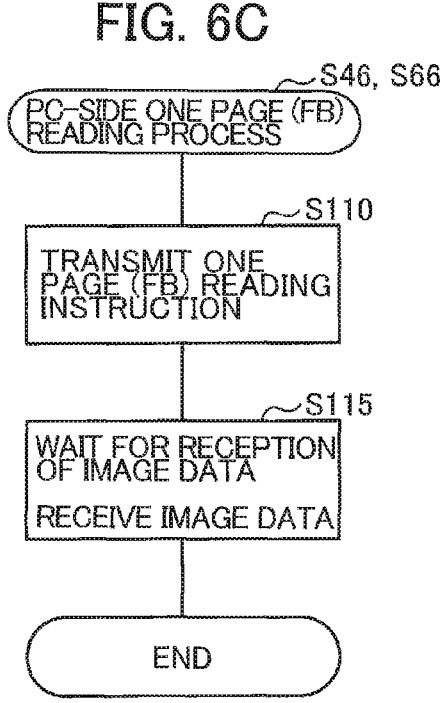

IMAGE READING APPARATUS THAT OUTPUTS ONE OR MORE FILES IN WHICH IS STORED GENERATED IMAGE DATA

CROSS REFERENCE TO RELATED APPLICATION

This application claims priority from Japanese Patent Application No. 2015-072609 filed Mar. 31, 2015. The entire content of the priority application is incorporated herein by reference.

TECHNICAL FIELD

The present disclosure relates to an image reading apparatus and an image reading system.

BACKGROUND

As an image reading system, there has been proposed a system, in which an image reading apparatus reads images from a plurality of pages of sheets and a PC (Personal Computer) outputs a single multiple-page file in which is stored image data corresponding to the plurality of images.

In the above-described system, when a scan key is operated for the first time on the image reading apparatus, the image reading apparatus executes a reading process in response to the scan key operation. When the reading process is completed, the PC displays a completion confirmation screen, and a standby state continues until a prescribed time period is elapsed. When the scan key is operated next during the standby period on the image reading apparatus, the PC is shifted to a continuous scan mode. Thereafter, the continuous scan mode is continued every time the scan key is operated next during a time from when the scan key is operated the last time and until the standby period is expired. Image data indicative of the plurality of images read in the continuous scan mode is stored in a single multiple-page file.

The continuous scan mode is terminated when the scan key is not operated until the standby period is expired. The continuous scan mode is terminated also when a prescribed operation for terminating the continuous scan mode is performed on the PC while the completion confirmation screen is displayed.

SUMMARY

It is conceivable to modify the above-described system such that the system can output image data files not only in the file format supporting the multiple-page (hereinafter, referred to as "first format") but also in a file format not supporting the multiple-page (hereinafter, referred to as "second format"). When outputting files in the second format, image data files as many as the number of pages are generated such that image data corresponding to one page is stored in one file.

However, in such a conceivable system, the following problem occurs.

That is, even in a case where the second format is to be output, when the above-described scan key operation is performed, the PC is shifted to the continuous scan mode, and the completion confirmation screen is displayed. Thereafter, when the scan key is operated next in order to continue the continuous scan mode during the standby period, image data files as many as the number of the pages are output. Also when the next scan key operation is not performed, or when an instruction to terminate the continuous scan mode is inputted to the PC, image data files as many as the number of the pages are output.

That is, when the second format file is to be output, image data files as many as the number of the pages are output irrespective of whether the continuous scan mode is continued or terminated. Nevertheless, an inquiry through the completion conformation screen is displayed. This is troublesome for a user.

In view of the above situation, it is an object of the disclosure to provide an improved image reading apparatus and an improved image reading system that are capable of executing appropriate processing according to the file format of the file to be output.

According to one aspect, an image reading apparatus is provided. The image reading apparatus includes: an image reader, and a processor. The image reader is configured to read an image from a reading target and generate a set of image data representative of the read image. The image reader is configured to perform a reading process onto a group of reading targets to generate a group of image data. The group of reading targets is constituted by one or more reading targets. The group of image data is constituted by one or more sets of image data representative of one or more images read from the one or more reading targets. The processor is configured to: acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored; execute a first output process when the acquired information contains setting information indicating to output the first format file; and execute a second output process when the acquired information contains setting information to output the second format file. The processor is configured to execute the first output process by: controlling the image reader to perform the reading process onto a group of reading targets to generate a group of image data; after the image reader has performed the reading process onto the group of reading targets, executing an inquiry to inquire a user on whether to continue reading; every time when receiving an instruction to continue reading after having executed an inquiry, controlling the image reader to perform the reading process onto another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received. The processor is configured to execute the second output process by: controlling the image reader to perform the reading process onto a group of reading targets to generate a group of image data; and outputting one or more second format files, whose number is equal to a number of one or more sets of image data that constitutes the group of image data generated through the reading process, each of the one or more sets of image data being stored in a corresponding second format file.

According to another aspect, an image reading system is provided. The image reading system includes: an image reading apparatus; and an information processing apparatus. The image reading apparatus has an image reader and a controller. The image reader is configured to read an image from a reading target and generate a set of image data representative of the read image. The image reader is configured to perform a reading process onto a group of reading targets to generate a group of image data. The group of reading targets is constituted by one or more reading targets. The group of image data is constituted by one or more sets of image data representative of one or more images read from the one or more reading targets. The information processing apparatus has a processor configured to acquire image data generated by the image reader and to perform processing on the image data. The processor is configured to: acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored; execute a first output process when the acquired information contains setting information indicating to output the first format file; and execute a second output process when the acquired information contains setting information to output the second format file. The processor is configured to execute the first output process by: cooperating with the controller to control the image reader to perform the reading process onto a group of reading targets to generate a group of image data; after the image reader has performed the reading process onto the group of reading targets, executing an inquiry to inquire a user on whether to continue reading; every time when receiving an instruction to continue reading after having executed an inquiry, cooperating with the controller to control the image reader to perform the reading process onto another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received. The processor is configured to execute the second output process by: cooperating with the controller to control the image reader to perform the reading process onto a group of reading targets to generate a group of image data; and outputting one or more second format files, whose number is equal to a number of one or more sets of image data that constitutes the group of image data generated through the reading process, each of the one or more sets of image data being stored in a corresponding second format file.

According to another aspect, a non-transitory computer readable storage medium storing a set of program instructions for an image reading apparatus is provided. The image reading apparatus includes: an image reader; and a processor. The image reader is configured to read an image from a reading target and generate a set of image data representative of the read image. The image reader is configured to perform a reading process onto a group of reading targets to generate a group of image data. The group of reading targets is constituted by one or more reading targets. The group of image data is constituted by one or more sets of image data representative of one or more reading targets. The processor is configured to perform processing on image data generated by the image reader. The program instructions, when executed by the processor, causing the processor to perform: acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored; execute a first output process when the acquired information contains setting information indicating to output the first format file; and execute a second output process when the acquired information contains setting information to output the second format file. The processor executes the first output process by: controlling the image reader to perform the reading process onto a group of reading targets to generate a group of image data; after the image reader has performed the reading process onto the group of reading targets, executing an inquiry to inquire a user on whether to continue reading; every time when receiving an instruction to continue reading after having executed an inquiry, controlling the image reader to perform the reading process onto another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received. The processor executes the second output process by: controlling the image reader to perform the reading process onto a group of reading targets to generate a group of image data; and outputting one or more second format files, whose number is equal to a number of one or more sets of image data that constitutes the group of image data generated through the reading process, each of the one or more sets of image data being stored in a corresponding second format file.

According to another aspect, a non-transitory computer readable storage medium storing a set of program instructions for an image reading system is provided. The image reading system includes: an image reading apparatus having an image reader and a controller, and an information processing apparatus having a processor. The image reader is configured to read an image from a reading target and generate a set of image data representative of the read image. The image reader is configured to perform a reading process onto a group of reading targets to generate a group of image data. The group of reading targets is constituted by one or more reading targets. The group of image data is constituted by one or more sets of image data representative of one or more images read from the one or more reading targets. The processor is configured to acquire image data generated by the image reader and to perform processing on the image data. The program instructions, when executed by the processor, causes the processor to: acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored; execute a first output process when the acquired information contains setting information indicating to output the first format file; and execute a second output process when the acquired information contains setting information to output the second format file. The processor executes the first output process by: cooperating with the controller to control the image reader to perform the reading process onto a group of reading targets to generate a group of image data; after the image reader has performed the reading process onto the group of reading targets, executing an inquiry to inquire a user on whether to continue reading; every time when receiving an instruction to continue reading after having executed an inquiry, cooperating with the controller to control the image reader to perform the reading process onto another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received. The processor executes the second output process by: cooperating with the controller to control the image reader to perform the reading process onto a group of reading targets to generate a group of image data; and outputting one or more second format files, whose number is equal to a number of one or more sets of image data that constitutes the group of image data generated through the reading process, each of the one or more sets of image data being stored in a corresponding second format file.

BRIEF DESCRIPTION OF THE DRAWINGS

The particular features and advantages of the disclosure will become apparent from the following description taken in connection with the accompanying drawings, in which:

FIG. 5 is a flowchart showing a PC-side reading process executed by a personal computer (PC) shown in FIG. 4 according to the second embodiment;

FIG. 6A is a flowchart showing a PC-side condition/format settings acquiring process shown in FIG. 5;

FIG. 6B is a flowchart showing a PC-side ADF reading process shown in FIG. 5;

FIG. 6C is a flowchart showing a PC-side one page (FB) reading process shown in FIG. 5.

DETAILED DESCRIPTION

Figure 1A:
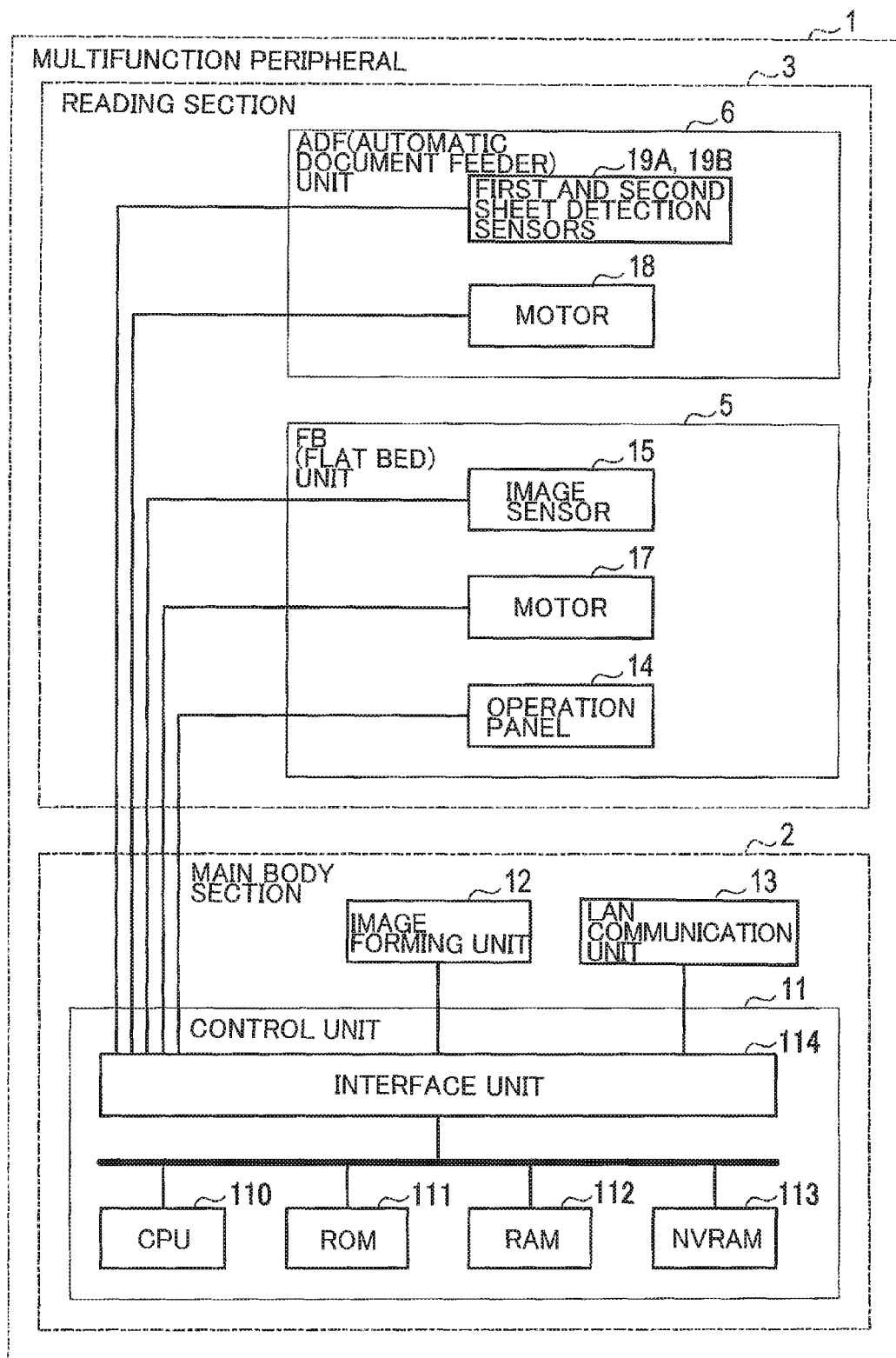
FIG. 1A is a block diagram illustrating an electrical configuration of a multifunction peripheral according to a first embodiment.

A multifunction peripheral 1 (an example of an image reading apparatus) according to a first embodiment will be described while referring to the accompanying drawings wherein like parts and components are designated by the same reference numerals to avoid duplicating description.

(1) First Embodiment

[Configuration of Multifunction Peripheral]

As illustrated in FIG. 1A, the multifunction peripheral 1 includes: a main body section 2; and a reading section 3. The main body section 2 includes: a control unit 11 (an example of a processor); an image forming unit 12; and a LAN communication unit 13. The reading section 3 includes: an FB (Flat Bed) unit 5; and an ADF (Automatic Document Feeder) unit 6. The FB unit 5 includes: an image sensor 15 (an example of an image reader); a motor 17; and an operation panel 14 (an example of an operating device). The ADF unit 6 includes a motor 18 and first and second sheet detection sensors 19A and 19B.

The control unit 11 includes a CPU 110, a ROM 111, a RAM 112, an NVRAM 113, and an interface unit 114, all of which are well known in the art. The CPU 110 executes prescribed processing according to control programs stored in the ROM 111 or the RAM 112, whereby controlling respective portions in the multifunction peripheral 1, that is, the image forming unit 12, LAN communication unit 13, operation panel 14, image sensor 15, motors 17 and 18, and sheet detection sensors 19A and 19B. The control programs stored in the ROM 111 or RAM 112 include a control program for a reading process according to the present embodiment which will be described later with reference to FIGS. 2 and 3.

The image forming unit 12 is configured to form an image onto a recording medium according to an inkjet method. More in detail, the image forming unit 12 is provided with: a conveying mechanism for conveying a recording medium; a recording head for ejecting ink; and a drive mechanism for reciprocally moving the recording head. These components each have a known configuration, so further descriptions and illustration thereof will be omitted. The image forming unit 12 may be configured to form an image onto a recording medium according to an electrophotographic method.

The LAN communication unit 13 is constituted of: a communication interface device supporting a wireless LAN; and a communication interface device supporting a wired LAN.

Figure 3:
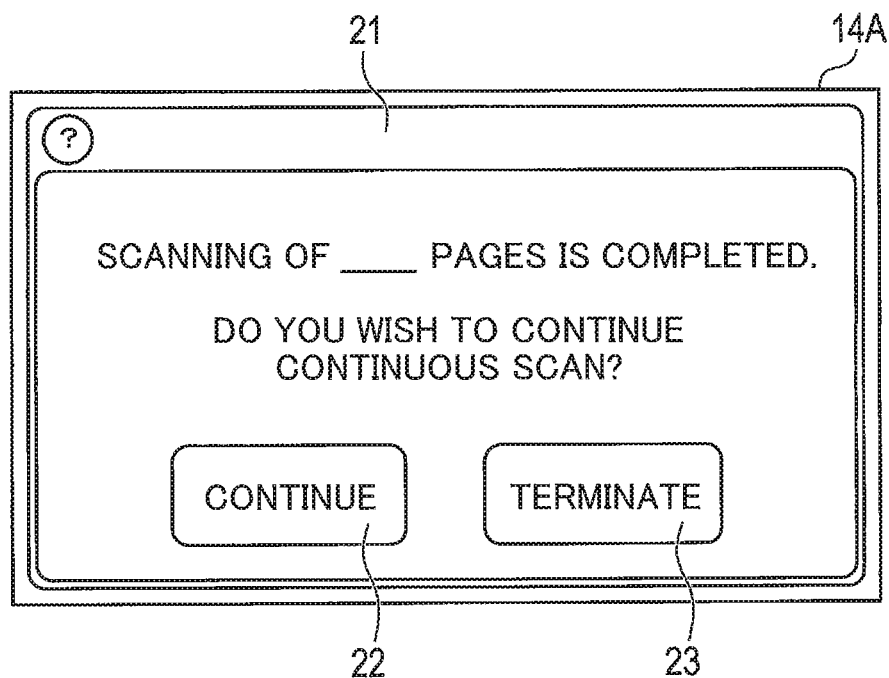
FIG. 3 illustrates a selection screen inquiring whether to continue a continuous scan in the reading process of FIG. 2.

The operation panel 14 includes: a liquid crystal display 14A shown in FIG. 3, which serves as an output device to notify a user of an operating state of the multifunction peripheral 1, a selection screen 21 (FIG. 3), and the like; and a transparent touch panel, which is stacked over the liquid crystal display 14A and which serves as an input device to be operated by a user to input various instructions into the multifunction peripheral 1. In place of or in addition to the liquid crystal display 14A, the operation panel 14 may include various lamps or other output devices. In place of or in addition to the touch panel, the operation panel 14 may include various buttons, switches, or other input devices.

Figure 1B:
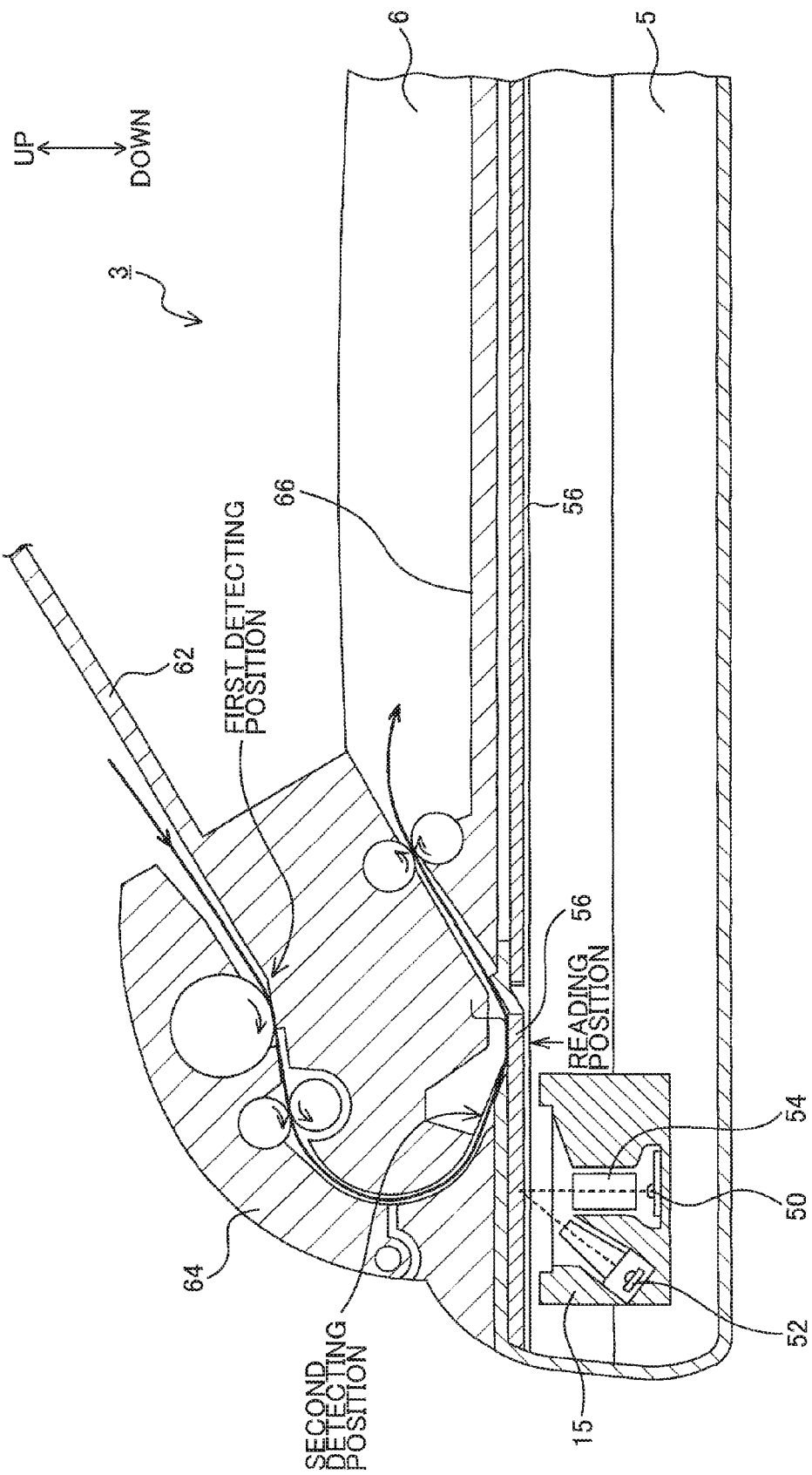
FIG. 1B is a cross-sectional view showing part of a reading section in the multifunction peripheral shown in FIG. 1A.

FIG. 1B is a cross-sectional view of part of the reading section 3. The reading section 3 has a clamshell structure, in which the ADF unit 6 is attached to the FB unit 5 and is capable of opening and closing thereon. FIG. 1B shows the state that the ADF unit 6 is at the closed position. In the description for the reading section 3, the terms "upward", "downward", "upper", "lower", "above", "below", "beneath", and the like will be used assuming that the multifunction peripheral 1 is disposed in an orientation in which it is intended to be used. In use, the multifunction peripheral 1 is disposed such that the reading unit 3 is disposed in the orientation shown in FIG. 1B.

The FB unit 5 has a platen 56. In the FB unit 5, the image sensor 15 is disposed below the platen 56 so as to be movable in a sub-scanning direction (leftward and rightward direction in FIG. 1B). The image sensor 15 is a CIS (Contact Image Sensor) in this example. As shown in FIG. 1B, the image sensor 15 includes an array of reading elements 50, a light source 52, and a lens 54. The array of reading elements 50 is constituted from a plurality of reading elements 50 that are arranged in a main scanning direction (the direction orthogonal to the drawing of FIG. 1B) that is perpendicular to the sub-scanning direction. An image formed on a surface of a sheet is read by the image sensor 15 when the sheet is positioned at an opposite side of the image sensor 15 across the platen 56 such that the surface of the sheet confronts the image sensor 15 through the platen 56. In the image sensor 15, the light source 52 emits light toward the surface of the sheet. The light reflects off the surface of the sheet, and is focused by the lens 54 on the reading elements 50. The reading elements 50 convert the amount of the received light into electric signals, thereby generating image data indicative of the amount of the received light. In this way, the image sensor 15 generates image data indicative of the image formed on the surface of the sheet.

The motor 17 (shown in FIG. 1A) is provided in the FB unit 5 and serves as a power source for moving the image sensor 15 in the sub-scanning direction. When the reading unit 3 executes a one page (FB) reading, the image sensor 15 is reciprocally moved in the sub-scanning direction. Contrarily, when the reading unit 3 executes an ADF reading, the image sensor 15 stays at rest such that the array of the reading elements 50 is disposed directly below a reading position that is defined on the platen 56 in the sub-scanning direction.

The ADF unit 6 has a feeding tray 62 (an example of a supply position), a conveying device 64 (an example of a conveyor), and a discharge tray 66 (an example of a discharging position). A prescribed sheet conveying path (an example of a conveying path) is defined from the feeding tray 62 to the discharge tray 66. One or more sheets (an example of a group of reading targets) can be stacked on the feeding tray 62. The conveying device 64 includes one or more rollers to convey one sheet at a time in a conveying direction from the feeding tray 62 toward the discharge tray 66 along the sheet conveying path. The motor 18 (shown in FIG. 1A) is provided in the ADF unit 6 and serves as a power source for driving the conveying device 64. As shown in FIG. 1B, a first detecting position and a second detecting position are defined in this order in the sheet conveying direction along the sheet conveying path. The first detecting position is such a position that when a sheet is mounted in the feeding tray 62, a leading part of the sheet in the sheet conveying direction reaches and covers the first detecting position. As apparent from FIG. 1B, the second detecting position is disposed on the sheet conveying path immediately upstream, in the sheet conveying direction, from the reading position.

The first sheet detection sensor 19A is for detecting whether part of at least one sheet exists at the first detecting position, thereby detecting whether at least one sheet is mounted in the feeding tray 62. The second sheet detection sensor 19B is for detecting whether a leading edge or a trailing edge of a sheet in the sheet conveying direction passes through the second detecting position while the sheet is being conveyed by the conveying device 64 in the sheet conveying direction.

With the above-described configuration, the reading section 3 can perform both of the ADF reading and the one page (FB) reading on the front surfaces of sheets.

In order to perform the ADF reading, while the ADF unit 6 is at the closed position, a user places one or more sheets (an example of a group of reading targets) on the feeding tray 62 such that the front surface of each sheet faces upwardly. While the image sensor 15 stays at rest at the position that the array of the reading elements 50 is disposed directly below the reading position, the conveying device 64 is driven to convey the sheets one sheet by one sheet along the sheet conveying path to the discharge tray 66. The sheet passes the reading position with its front surface being in contact with the platen 56. At that time, the image sensor 15 reads an image on the front surface of the sheet in synchronization with the timings when the leading and trailing edges of the sheet are detected by the second sheet detection sensor 19B at the second detecting position. After the first sheet detection sensor 19A detects that there remains no more sheet on the feeding tray 62, the reading section 3 ends the ADF reading when a prescribed length of time is elapsed after the second sheet detection sensor 19B detects the trailing edge of the last sheet. In this way, in the ADF reading, the image sensor 15 reads the front surfaces of the one or more sheets which have been stacked on the feeding tray 62 and are conveyed by the conveying device 64 through the reading position. The contents of the ADF reading process are well known, so further descriptions thereof will be omitted.

In order to perform the one page (FB) reading, a user opens the ADF unit 6 and places one sheet (an example of a group of reading targets) on the platen 56 such that the front surface of the sheet faces downwardly. After the ADF unit 6 is closed, the image sensor 15 is driven to move reciprocally in the sub-scanning direction to scan the front surface of the sheet. More specifically, while the image sensor 15 is in the first half trip, the image sensor 15 reads an image on the front surface of the sheet that is supported on the platen 56. In this way, in the one page (FB) reading, the image sensor 15 reads the front surface of one sheet placed on the platen 56. The contents of the one page (FB) reading process are also well known, so further descriptions thereof will be omitted.

In the present embodiment, a group of settings for reading conditions and output formats is defined for the multifunction peripheral 1. The group of settings for reading conditions and output formats contains settings for a plurality of items including: a reading resolution; a color/monochrome setting; an image quality setting; a file format; and an output destination. The group of settings for the reading conditions and the output formats will be referred to also as a "group of condition/format settings" hereinafter. The settings for the respective items can be selected from a plurality of prescribed conditions and a plurality of prescribed setting values that are prepared in advance. Each item can also be set to a setting value that the user can freely input.

In this example, a plurality of different combinations of settings are prepared beforehand in association with a plurality of different possible purposes, and are stored in a memory such as the ROM 111. One of the combinations is set as a group of default settings. A user may use the default settings as the group of condition/format settings for his/her multifunction peripheral 1. The user may modify the setting for some item in the default settings. Or, the user may select, according to his/her purpose, one from among the plurality of combinations stored in the ROM 111, and set his/her selected combination as the group of condition/format settings for his/her multifunction peripheral 1. The user may modify the setting for some item in his/her selected combination.

The user can select and modify the setting values on the operation panel 14. The user can select and modify the setting values also through the external device. The user's selected (and modified) settings are stored in a memory such as the RAM 112 or NVRAM 113 as the group of condition/format settings for the multifunction peripheral 1.

In this example, the first format, such as PDF or TIFF, or the second format, such as JPEG, is set for the item of "file format" that is indicative of the file format of a file to be output from the multifunction peripheral 1.

[Reading Process]

Next will be described with reference to FIGS. 2 and 3 the reading process executed by the multifunction peripheral 1.

The control unit 11 starts executing the reading process when a prescribed operation for instructing the multifunction peripheral 1 to start the reading process is performed on the operation panel 14. The control unit 11 starts executing the reading process also when a signal for instructing the multifunction peripheral 1 to start the reading process is transmitted to the multifunction peripheral 1 from an external device, such as a PC, that can communicate with the multifunction peripheral 1.

Figure 2:
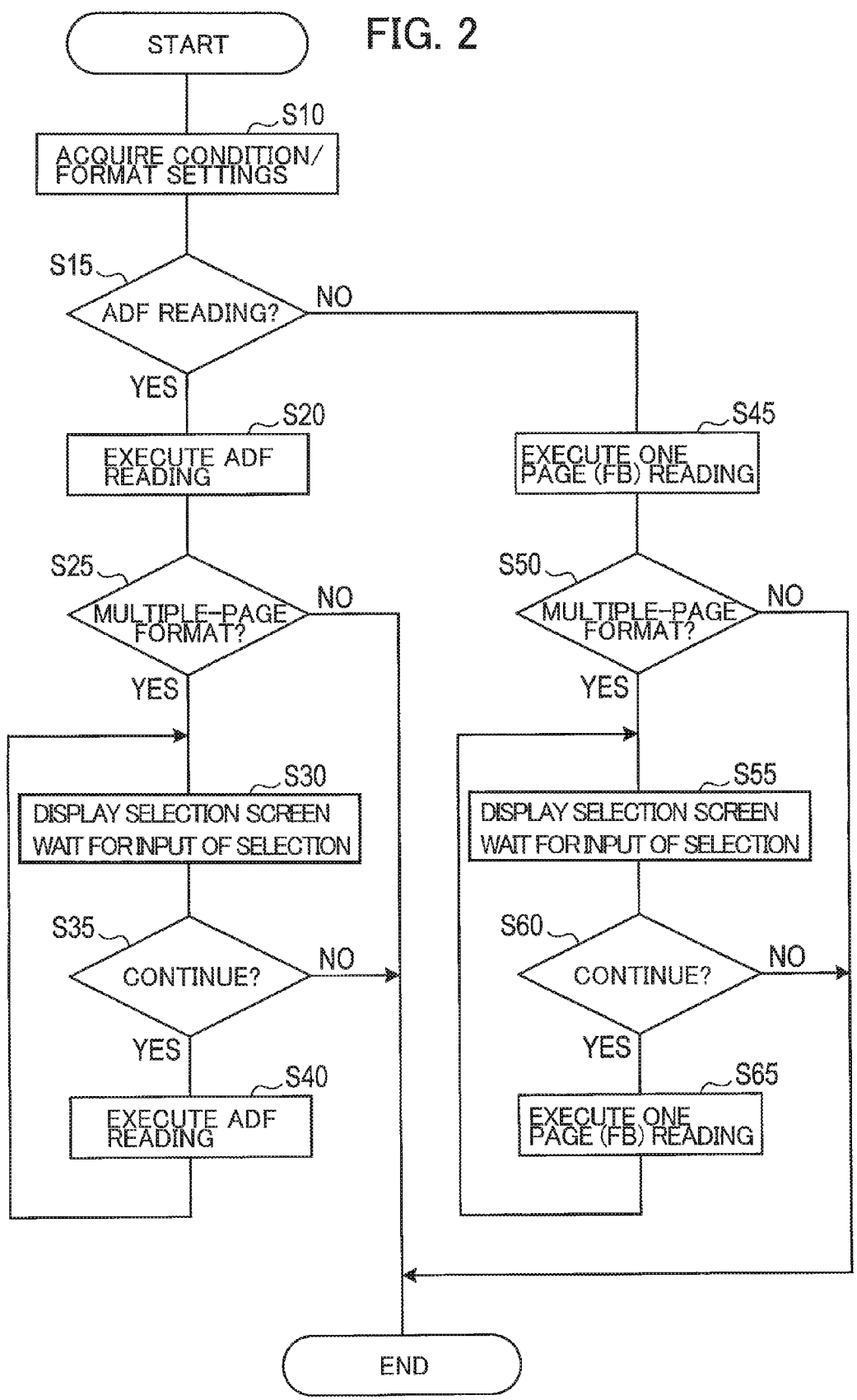
FIG. 2 is a flowchart showing a reading process executed by the multifunction peripheral of FIG. 1 according to the first embodiment.

As shown in FIG. 2, when the control unit 11 starts executing the reading process, first in S10, the control unit 11 acquires the group of condition/format settings by reading the group of condition/format settings from the memory (RAM 112 or NVRAM 113). According to the acquired setting values, the control unit 11 initializes the respective sections in the multifunction peripheral 1 to execute the reading process.

Subsequently, the control unit 11 determines in S15 whether or not to execute an ADF reading in the current reading process. The control unit 11 determines whether or not to execute an ADF reading based on the detection results of the first sheet detection sensor 19A indicative of whether at least one sheet is set in the feeding tray 62.

When at least one sheet is set in the feeding tray 62 and therefore the control unit 11 determines that an ADF reading should be executed in the current reading process (YES in S15), the control unit 11 executes the ADF reading in S20. In S20, the control unit 11 drives the motor 18 to activate the conveying device 64 to convey, one sheet by one sheet, the sheets set in the feeding tray 62 along the sheet conveying path. Every time when a sheet is conveyed with its front surface being in contact with the platen 56, the image sensor 15 reads an image from the front surface of the sheet, and generates image data indicative of the read image. The image sensor 15 outputs the image data to the control unit 11.

In S20, upon receipt of the image data, the control unit 11 outputs the image data in a file format set in the condition/format settings acquired in S10. For example, the control unit 11 outputs a PDF file when PDF (an example of a first format) is set as a file format, a TIFF file when TIFF (another example of the first format) is set as a file format, or a JPEG file when JPEG (an example of a second format) is set as a file format.

It is noted that when the second format such as JPEG is set as a file format, in S20, an image is read from each of all the at least one sheet set in the feeding tray 62, and image data as many as the number of the read sheets (the number of read pages) are each stored in the second-format file, with the result that second-format files as many as the number of the read sheets are output. On the other hand, when the first format such as PDF or TIFF is set as a file format, in S20, an image is read from each of all the at least one sheet set in the feeding tray 62, and image data as many as the number of the read sheets (the number of the read pages) is stored in the single first-format file, with the result that a single first-format file is output.

It is noted, however, that in S20, the control unit 11 may not output the image data in the final file format set in the condition/format settings. For example, the following procedure may be adopted. That is, the control unit 11 outputs in S20 image data into a temporary file that is suitable for a post-processing. Then, immediately before ending the reading process of FIG. 2, the control unit 11 generates a file of the final file format based on the temporary file. Or, the control unit 11 may output in S20 an output file of the final file format (PDF file, TIFF file, or JPEG file). In this case, immediately before ending the reading process of FIG. 2, the control unit 11 may convert the output file into an attached file of a mail format according to the setting of the output destination that is contained in the group of condition/format settings. In this way, the control unit 11 may generate a final file through executing a plurality of steps.

Subsequently, in S25, the control unit 11 determines whether or not the first format (PDF or TIFF, in this example) supporting the multiple-page format is set as the file format of a file to be output in the group of condition/format settings.

When the first format (PDF or TIFF, in this example) supporting the multiple-page format is not set in the group of condition/format settings (NO in S25), which means that a second format (JPEG, in this example) not supporting the multiple-page format is set in the group of condition/format settings, and therefore the reading process of FIG. 2 is ended.

On the other hand, when the first format (PDF or TIFF, in this example) supporting the multiple-page format is set in the group of condition/format settings (YES in S25), in S30 the control unit 11 displays on the operation panel 14 the selection screen 21 inviting the user to select continuation or termination of the reading process, and waits for input of the user's selection. At this time, as illustrated in FIG. 3, the selection screen 21 is displayed on the liquid crystal display 14A of the operation panel 14. The selection screen 21 contains: a "continue" button 22 which is operated to continue the reading process; and a "terminate" button 23 which is operated to terminate the reading process. When the user performs touching operation on one of buttons 22 and 23, the process advances to S35.

The user's touching operation is detected by the transparent touch panel (not shown) that is stacked on the liquid crystal display 14A. The control unit 11 can determine which of the buttons 22 and 23 is touched based on coordinate information detected by the touch panel. When the user touches one of the buttons 22 and 23, the selection screen 21 disappears from the liquid crystal display 14A.

Subsequently, the control unit 11 determines in S35 whether or not to continue the reading process. The control unit 11 determines to continue the reading process when it is detected in S30 that the "continue" button 22 is touched (YES in 835). In this case, the control unit 11 executes the ADF reading again in S40 to scan one or more sheets that are newly mounted in the feeding tray 62 and newly generate image data. The processing of S40 is substantially the same as that of S20 except for the following points. That is, a new file is generated in S20. Contrarily, in S40, new image data is added to the file generated in S20. In the case where image data is output to a temporary file in S20, new image data is output to the temporary file also in S40, and a final file is generated based on the temporary file immediately before the end of the processing of FIG. 2.

After completion of S40, the procedure returns to S30. That is, the processes of S30 and subsequent processes are executed again. Therefore, every time when the "continue" button 22 is touched, one or more sheets that are newly mounted on the feeding tray 62 are scanned and newly-generated image data is added to the file of the first format (multiple-page format supporting file) in S40.

On the other hand, when it is detected in S30 that the "terminate" button 23 is touched (NO in S35), the control unit 11 determines to end the reading process. In this case, the control unit 11 ends the reading process of FIG. 2. In this way, every time when the process of S20 or S40 is executed, at least one image on at least one sheet that is mounted on the feeding tray 62 is scanned, and all the sets of image data, whose number is equal to the total number of the sheets scanned, are generated and stored in the single first-format file (multiple-page PDF file or multiple-page TIFF file, in this example). Through executing the process of S20 once and executing the process of S40 one or more times, all the sets of image data, whose number is equal to the total number of the sheets that have been scanned during all the executed processes of S20 and S40, are generated and stored in the single first-format file (multiple-page PDF file or multiple-page TIFF file). Thus, a single multiple-page file is output.

On the other hand, when no sheet is set in the feeding tray 62 and therefore the control unit 11 determines that an ADF reading should not be executed (NO in S15), the control unit 11 executes in S45 a one page (FB) reading on the front surface of a sheet that is supported on the platen 56 with the front surface confronting the platen 56. In S45, the control unit 11 drives the motor 17 to move the image sensor 15 reciprocally in the sub-scanning direction. While the image sensor 15 is moving in the first half trip, the image sensor 15 reads an image from the front surface of the sheet that is placed on the platen 56, generates image data indicative of the read image, and outputs the image data to the control unit 11.

In S45, upon receipt of the image data, the control unit 11 outputs the image data in a file format set in the group of condition/format settings acquired in S10. More specifically, when the second format such as JPEG is set as the file format, in S45, an image on the one sheet supported on the platen 56 is read, and one set of image data of the read image is stored in a second-format file, with the result that a single second-format file is output. On the other hand, when the first format such as PDF or TIFF is set in the group of condition/format settings, in S45, an image is read from the one sheet supported on the platen 56, and one set of image data is stored in the single first-format file, with the result that a single first-format file is output.

It is noted, however, that in 845, similarly to S20, image data may be output to a temporary file, and a final file may be generated based on the temporary file immediately before the end of the processing of FIG. 2.

Subsequently, the control unit 11 determines in S50 whether or not the first format (PDF file or TIFF file in the present embodiment) supporting the multiple-page format is set as the file format of a file to be output in the group of condition/format settings. When the first format supporting the multiple-page format is not set (NO in S50), the reading process of FIG. 2 is ended.

On the other hand, when the first format supporting the multiple-page format is set (YES in S50), in S55 the control unit 11 displays on the operation panel 14 the selection screen 21 inviting the user to select continuation or termination of the reading process, and waits for input of the user's selection. The processing of S55 is substantially the same as that of S30, so further descriptions thereof will be omitted.

Subsequently, the control unit 11 determines in S60 whether or not to continue the reading process. In S60, the control unit 11 determines to continue the reading process when it is detected in S55 that the "continue" button 22 is touched (YES in S60). In this case, the control unit 11 executes the one page (FB) reading again in S65 to scan a sheet that is newly placed on the platen 56 and newly generate image data. The processing of S65 is substantially the same as that of S45 except for the following points. That is, a new file is generated in S45. Contrarily, in S65, new image data is added to the file generated in S45. In the case where image data is output to a temporary file in 845, new image data is output to the temporary file also in S65, and a final file is generated based on the temporary file immediately before the end of the processing of FIG. 2.

After completion of S65, the procedure returns to S55. That is, the processes of S55 and subsequent processes are executed again. Therefore, every time when the "continue" button 22 is touched, a sheet that is newly placed on the platen 56 is scanned and newly-generated image data is added to the first-format file (multiple-page format supporting file) in S65.

On the other hand, when it is detected in S55 that the "terminate" button 23 is touched (NO in S60), the control unit 11 determines to end the reading process. In this case, the control unit 11 ends the reading process of FIG. 2. In this way, every time when the process of S45 or S65 is executed, an image on a sheet that is supported on the platen 56 is scanned, and one set of image data is generated and stored in the single first-format file (multiple-page PDF file or multiple-page TIFF file, in this example). Through executing the process of S45 once and executing the process of S65 one or more times, all the sets of image data, whose number is equal to the total number of the sheets that have been scanned during all of the executed processes of S45 and S65, are generated and stored in the single first-format file (multiple-page PDF file or multiple-page TIFF file). Thus, a single multiple-page file is output.

[Advantages]

According to the thus configured multifunction peripheral 1, when a setting to output a first-format file (PDF file or TIFF file, in this example) is contained in the group of condition/format settings acquired in S10, first the reading process is executed in S20 or S45 onto the first group of reading targets (that is, one or more sheets that are set in the feeding tray 62 for the first time in the current reading process, or one sheet that is placed on the platen 56 for the first time in the current reading process). Then, when an operation to continue the reading process is performed in the repeatedly-executed inquiry process of S30 or S55, the multifunction peripheral 1 repeatedly executes the reading process in S40 or S65, thereby scanning in succession the second and subsequent groups of reading targets (that is, sheets set in the feeding tray 62 for the second and subsequent times in the current reading process, or sheets placed on the platen 56 for the second and subsequent times in the current reading process). Image data obtained from the images in all the groups of reading targets through all of the executed reading processes of S20 and S40 or S45 and S65 are stored in the single first-format file. Thus, all the image data can be output as a single first-format file. The processes of executing S20 and executing S30 to S40 after affirmative determination in S25, and the processes of executing S45 and executing S55 to S65 after affirmative determination in S50 are examples of a first output process.

On the other hand, when a setting to output the second-format file (JPEG file, in this example) is contained in the condition/format settings acquired in S10, the reading processing is executed in S20 or S45 onto the first group of reading targets (that is, one or more sheets that are set in the feeding tray 62 for the first time in the current reading process, or one sheet that is placed on the platen 56 for the first time in the current reading process). As a result, one or more sets of image data, which is obtained from all of the one or more image in the first group of reading targets through the reading process of S20 or S45, is stored in the one or more second-format file in one-to-one correspondence with the scanned one or more images, without performing the inquiry processing of S30 or S55. Thus, second-format files as many as the number of the scanned images can be output. Thus, unlike the case where the first-format file is output, the user need not respond to the inquiry processing, whereby operability in outputting the second-format file can be improved as compared to the case where the first-format file is output. The processing of executing S20 and advancing to the end of the routine after negative determination of S25, and the processing of executing S45 and advancing to the end of the routine after the negative determination of S50 are examples of a second output process.

In the processing of the ADF reading, the sheet conveying device 64 conveys one sheet at a time from among the at least one sheet mounted on the sheet feeding tray 62 to the sheet discharge tray 66 along the sheet conveying path. The image sensor 15 reads an image from each sheet when the sheet is being conveyed by the sheet conveying device 64.

Through the ADF reading processing, the at least one sheet is scanned to generate image data, and at least one file, in which the generated image data is stored and whose format is according to the setting included in the acquired condition/format settings, is output.

In the FB unit 5, one sheet is supported on the platen 56, and the image sensor 15 reads an image from the sheet supported on the platen 56. Through the one page (FB) reading processing, the sheet on the platen 56 is scanned to generate image data, and a file, in which the generated image data is stored and whose format is according to the setting included in the acquired condition/format settings, is output.

(2) Second Embodiment

Next, an image reading system 100 according to a second embodiment will be described with reference to FIGS. 4-7. In the second embodiment, the same reference numerals are given to the same or similar components as in the first embodiment.

[Configuration of Image Reading System]

Figure 4:
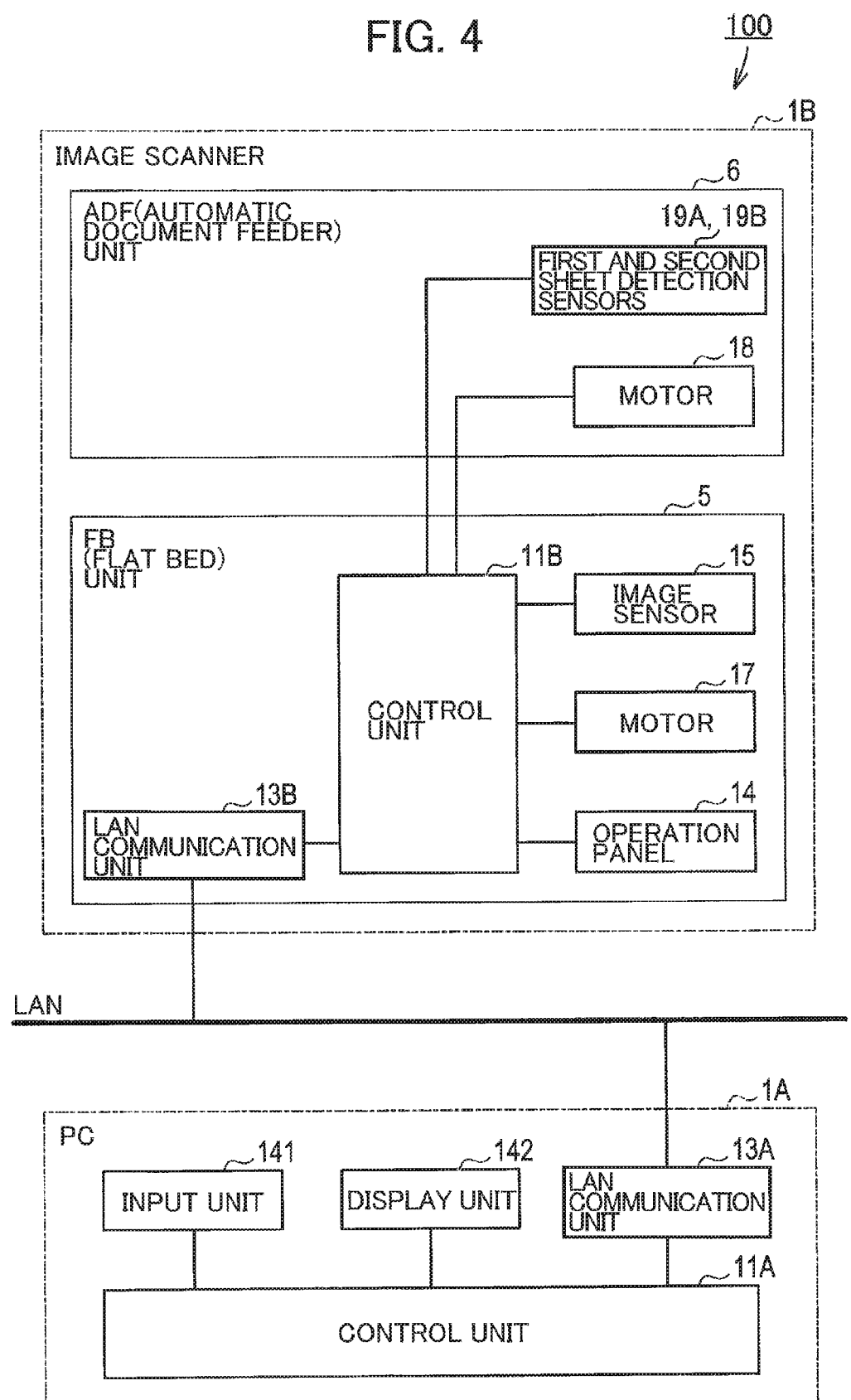
FIG. 4 is a block diagram illustrating an electrical configuration of an image reading system according to a second embodiment.

As illustrated in FIG. 4, the image reading system 100 according to the second embodiment is configured to realize the same function as that of the multifunction peripheral 1 in the first embodiment by a PC (Personal Computer) 1A (an example of an information processing apparatus) and an image scanner 1B (an example of an image reading apparatus) cooperating with each other.

The PC 1A includes a control unit 11A (an example of a processor), a LAN communication unit 13A, an input unit 141, and a display unit 142. The control unit 11A has a configuration corresponding to the control unit 11 in the first embodiment. Although not illustrated in FIG. 4, as in the control unit 11 of the first embodiment, the control unit 11A includes a CPU, ROM, RAM, NVRAM, and interface unit, all of which are well known. A control program for a PC-side reading process (to be described later with reference to FIGS. 5-6C) executed by the control unit 11A in the present embodiment is stored in the ROM or RAM of the control unit 11A.

In terms of hardware, the LAN communication unit 13A has a configuration corresponding to the LAN communication unit 13 of the first embodiment. In the present embodiment, the LAN communication unit 13A is used to perform communication with the image scanner 1B. The input unit 141 and the display unit 142 play the same role as that of the operation panel 14 of the first embodiment.

The image scanner 1B includes the FB unit 5 and the ADF unit 6, similarly to the reading section 3 of the multifunction peripheral 1 of the first embodiment. In the present embodiment, the ADF unit 6 has substantially the same configuration as that in the first embodiment, and the FB unit 5 has substantially the same configuration as that in the first embodiment, except for the following points: That is, the FB unit 5 further includes a control unit 11B (an example of a controller) and a LAN communication unit 13B. The control unit 11B is electrically connected to: the motor 18 and sheet detection sensors 19A and 19B which are provided in the ADF unit 6; the LAN communication unit 13B, operation panel 14, image sensor 15; and motor 17 which are provided in the FB unit 5. The operation panel 14, image sensor 15, motors 17 and 18, and sheet detection sensors 19A and 19B have the same configurations as those described in the first embodiment.

Like the control unit 11A, the control unit 11B has a configuration corresponding to the control unit 11 of the first embodiment. More in detail, in the second embodiment, some of the processing executed by the control unit 11 of the first embodiment is executed by the control unit 11A, and remaining processing is executed by the control unit 11B. That is, the control unit 11A and the control unit 11B cooperate with each other to achieve the reading process equivalent to that performed in the first embodiment. Although not illustrated in FIG. 4, as in the control unit 11 of the first embodiment, the control unit 11B includes a CPU, ROM, RAM, NVRAM, and interface unit, all of which are well known. A control program for a resident process executed by the control unit 11B in the second embodiment is stored in the ROM or RAM of the control unit 11B. The resident process serves as an image-scanner side reading process, and will be described later with reference to FIG. 7. In addition, the group of condition/format settings is set for the image scanner 1B similarly to the multifunction peripheral 1 of the first embodiment, and is stored in a memory such as the RAM or NVRAM of the control unit 11B.

In terms of hardware, the LAN communication unit 13B has a configuration corresponding to the LAN communication unit 13 of the first embodiment. In the present embodiment, the LAN communication unit 13B is used to perform communication with the PC 1A.

In the second embodiment, the group of condition/format settings contains a setting for an additional item with respect to the type of the reading process. That is, the group of condition/format settings additionally contains either one of a setting to execute an ADF reading and a setting to execute a one page (FB) reading.

[Reading Process]

Next will be described with reference to FIGS. 5-7 the reading process executed by the image reading system 100.

The image reading system 100 starts executing the reading process when a prescribed operation for instructing the image reading system 100 to start the reading process is performed on the input unit 141 or the operation panel 14.

When the image reading system 100 starts executing the reading process, the PC 1A executes a PC-side reading process shown in FIG. 5. The PC-side reading process shown in FIG. 5 includes substantially the same procedures as those of the reading process of FIG. 2 except for the following points: That is, in the reading process of FIG. 2, the control unit 11 directly controls the image sensor 15, motors 17 and 18, and the like. Contrarily, in the present embodiment, the control unit 11A of the PC 1A cannot directly control the components of the image scanner 1B. Accordingly, the PC-side reading process of FIG. 5 is different from the reading process of FIG. 2 such that the processes of S10, S20, S40, S45, and S65 in the reading process of FIG. 2 are replaced by processes of S11, S21, S41, S46, and S66, in which the control unit 11A issues requests or instructions to the image scanner 1B.

Hereinafter, only the above-described different points will be described in detail.

When the control unit 11A starts executing the PC-side reading process, first in S11, the control unit 11A executes a PC-side condition/format settings acquiring process to acquire the group of condition/format settings which is set in the image scanner 1B.

Details of the PC-side condition/format settings acquiring process in S11 will be described below with reference to FIG. 6A.

When the control unit 11A starts executing the PC-side condition/format settings acquiring process, first in S90, the control unit 11A transmits to the image scanner 1B a request for the group of condition/format settings.

Figure 7:
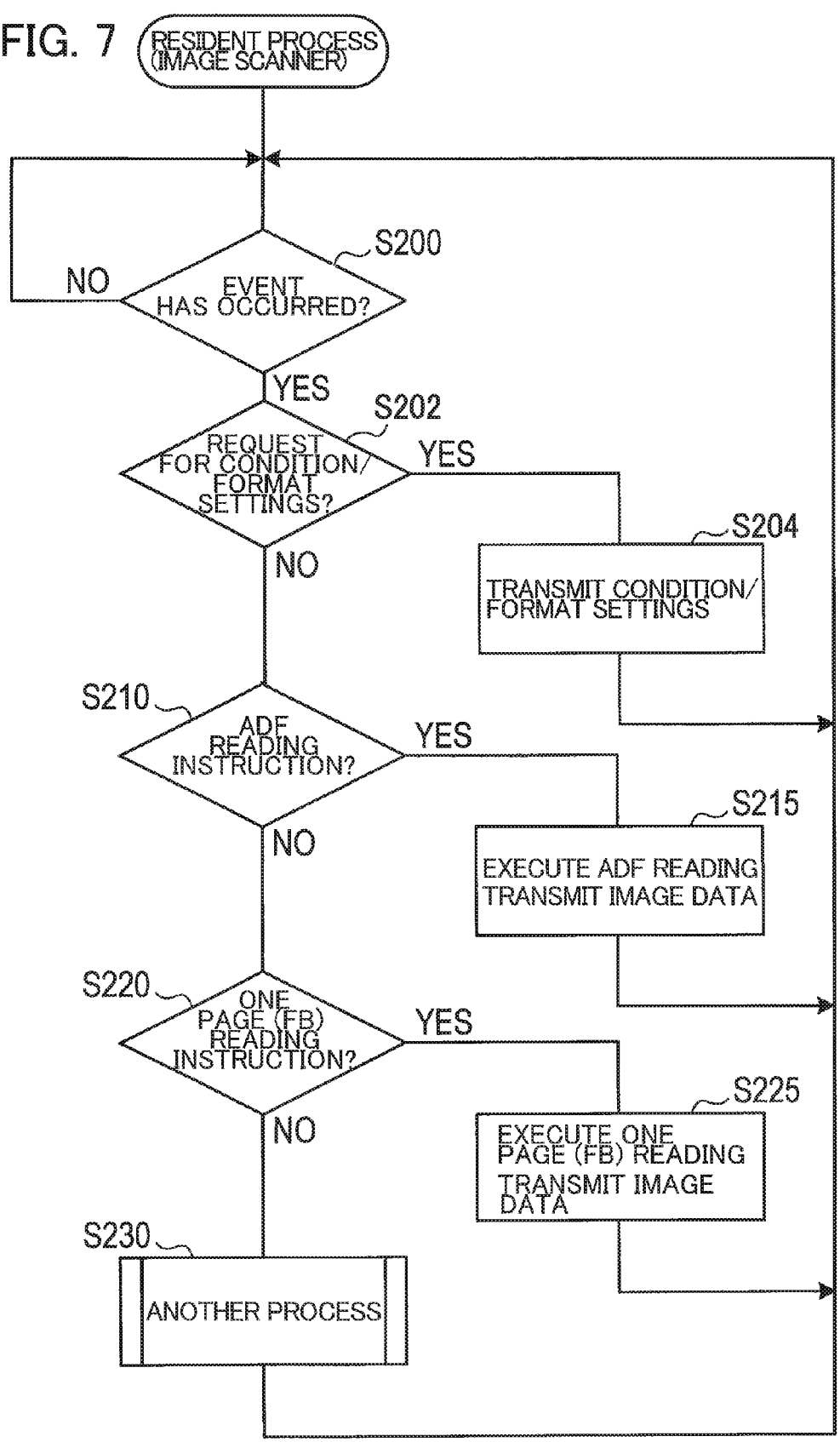
FIG. 7 is a flowchart showing a resident process (image-scanner side reading process) executed by an image scanner shown in FIG. 4 according to the second embodiment.

In the image scanner 1B, the control unit 11B is constantly executing the resident process shown in FIG. 7. More specifically, the control unit 11B starts executing the resident process when the image scanner 1B is activated, and executes the resident process repeatedly on a constant basis. In this resident process, the control unit 11B monitors occurrence of an event by repeatedly returning to S200 until some event occurs (NO in S200).

In this state, when the image scanner 1B receives the request for the group of condition/format settings from the PC 1A, the control unit 11B determines in S200 that some event has occurred (YES in S200). The control unit 11B next determines in S202 whether or not the event is the request for the group of condition/format settings. Because the image scanner 1B receives the request for the group of condition/format settings from the PC 1A, the control unit 11B determines in S202 that the event is the request for the group of condition/format settings (YES in S202). Accordingly, the procedure proceeds to S204, in which the control unit 11B reads the group of condition/format settings from the memory such as the RAM or NVRAM of the control unit 11B in a manner similar to the process of S10 (FIG. 2), and transmits the group of condition/format settings to the PC 1A. After completion of S204, the procedure returns to S200 to monitor occurrence of a new event.

Returning to FIG. 6A, after having transmitted the request for the group of condition/format settings in S90, the control unit 11A knows that the group of condition/format settings will be transmitted to the PC 1A from the image scanner LB, to which the PC 1A has transmitted the request in S90 and which is executing the resident process of FIG. 7. Accordingly, in S92, the control unit 11A waits for reception of the group of condition/format settings from the image scanner 1B. When the image scanner 1B transmits the group of condition/format settings to the PC 1A, the control unit 11A receives the group of condition/format settings. Then, in S94, the control unit 11A displays a setting screen (not shown) on the display unit 142 to show the received group of condition/format settings. A user can operate the input unit 141 to edit the contents of the setting screen so as to modify the setting values in the group of condition/format settings. When the user inputs into the input unit 141 his/her final confirmation on the contents of the setting screen, the procedure proceeds to S96, in which the group of condition/format settings finally confirmed by the user is stored in a memory such as the RAM or NVRAM of the control unit 11A, and ends the processing of FIG. 6A.

When the PC-side condition/format settings acquiring process shown in FIG. 6A is completed, this means that the PC-side condition/format settings acquiring process of S11 is ended in FIG. 5. Accordingly, the procedure proceeds to S15, in which the control unit 11A determines whether to execute an ADF reading in the current reading process by determining whether the group of condition/format settings finally set in S11 contains a setting to execute an ADF reading.

When the control unit 11A determines in S15 that the group of condition/format settings contains the setting to execute an ADF reading (YES in S15), the control unit 11A executes a PC-side ADF reading process in S21.

Details of the PC-side ADF reading process in S21 are illustrated in FIG. 6B.

When the control unit 11A starts executing the PC-side ADF reading process, first in S100, the control unit 11A transmits to the image scanner 1B an instruction to execute an ADF reading.

As described above, in the image scanner 1B, the control unit 11B is executing the resident process shown in FIG. 7. When the image scanner 1B receives the ADF reading instruction from the PC 1A, the control unit 11B determines that some event has occurred (YES in S200). In this case, the control unit 11B first determines that the event is not the request for the group of condition/format settings (NO in S202). The control unit 11B next determines in S210 whether or not the event is the ADF reading instruction. Because the image scanner 1B receives the ADF reading instruction, the control unit 11B determines that the event is the ADF reading instruction (YES in S210), and the procedure proceeds to S215, in which the control unit 11B executes an ADF reading to read one or more images and generate image data, and transmits the image data to the PC 1A.

The ADF reading process in S215 is similar to the ADF reading process of S20 or S40 in the first embodiment except for the following points: That is, in S20, a file (or temporary file), in which the generated image data is stored, is generated. In S40, the generated image data is added to the already-generated file. Contrarily, in S215, the generated image data is transmitted to the PC 1A. After completion of S215, the procedure returns to S200 to monitor occurrence of a new event.

Returning to FIG. 6B, after having transmitted the ADF reading instruction in S100, the control unit 11A knows that image data will be transmitted to the PC 1A from the image scanner 1B, to which the PC 1A has transmitted the ADF reading instruction in S100 and which is executing the resident process of FIG. 7. Accordingly, in S105, the control unit 11A waits for reception of image data from the image scanner 1B. When the image scanner 1B transmits image data to the PC 1A, the control unit 11A receives the image data, outputs a file (or temporary file) in which the image data is stored, and ends the processing of FIG. 6B.

When the PC-side ADF reading process shown in FIG. 6B is completed, this means that the PC-side ADF reading process of S21 is ended in FIG. 5. Accordingly, the control unit 11A executes the processes of S25 and the subsequent processes.

The processes of S25 and subsequent processes are the same as the processes of S25 and subsequent processes in the first embodiment except that the process of S41 is executed in place of the process of S40 and except for the following points:

That is, in S30 of the first embodiment, the selection screen 21 is displayed on the operation panel 14 of the multifunction peripheral 1, and input of the user's selection of the button 22 or 23 is waited. Contrarily, in the present embodiment, the selection screen 21 is displayed on the display section 142 of the PC 1A, and input of the user's selection into the input device 141 is waited.

In S41, the control unit 11A executes the PC-side ADF reading process shown in FIG. 6B. Also at this time, through execution of the resident process of FIG. 7 on the image scanner 1B side, the PC 1A acquires image data from the image scanner 1B.

On the other hand, when the control unit 11A determines that the group of condition/format settings does not contain the setting to execute an ADF reading (NO in S15), the control unit 11A executes a PC-side one page (FB) reading process in S46.

Details of the PC-side one page (FB) reading process in S46 are illustrated in FIG. 6C.

When the control unit 11A starts executing the PC-side one page (FB) reading process, first in S110, the control unit 11A transmits to the image scanner 1B an instruction to execute a one page (FB) reading.

In the image scanner 1B, as described above, the control unit 11B is executing the resident process of FIG. 7. In this state, when the image scanner 1B receives the one page (FB) reading instruction, the control unit 11B determines that some event has occurred (YES in S200), that the event is not the request for the group of condition/format settings or the ADF reading instruction (NO in S202 and S210), and therefore the control unit 11B determines in S220 whether or not the event is the one page (FB) reading instruction.

Because the image scanner 1B receives the one page (FB) reading instruction, the control unit 11B determines that the event is the one page (FB) reading instruction (YES in S220). Accordingly, the procedure proceeds to S225 in which the control unit 11B executes a one page (FB) reading to read an image and generate image data, and transmits the image data to the PC 1A.

The one page (FB) reading process in S225 is similar processing to the one page (FB) reading process of S45 or S65 of the first embodiment except for the following points: That is, in S45, a file (or temporary file), in which the generated image data is stored, is generated. In S65, the generated image data is added to the already-generated file. Contrarily, in S225, the generated image data is transmitted to the PC 1A. After completion of S225, the procedure returns to S200 to monitor occurrence of a new event.

It is noted that when the control unit 11B determines in S220 that the event is not the one page (FB) reading instruction (NO in S220), the control unit 11B executes in S230 another process corresponding to the event, and returns to S200 after completion thereof. The processing executed in S230 is a processing corresponding to an event other than the request for the group of condition/format settings, ADF reading instruction, and one page (FB) reading instruction. For example, when the prescribed operation for instructing the image reading system 100 to start the reading process is performed on the operation panel 14 (yes in S220), the control unit 11B transfers the instruction to the PC 1A in S230, whereupon the PC 1A starts the PC-side reading process of FIG. 5.

Returning to FIG. 6C, after having transmitted the one page (FB) reading instruction in S110, the control unit 11A knows that image data will be transmitted to the PC 1A from the image scanner 1B, to which the PC 1A has transmitted the one page (FB) reading instruction in S110 and which is executing the resident process of FIG. 7. Accordingly, in S115, the control unit 11A waits for reception of image data from the image scanner 1B. When the image scanner 1B transmits image data to the PC 1A, the control unit 11A receives the image data, outputs a file (or temporary file) in which the received image data is stored, and ends the processing of FIG. 6C.

When the PC-side one page (FB) reading process shown in FIG. 6C is completed, this means that the PC-side one page (FB) reading process of S46 is ended in FIG. 5. Accordingly, the control unit 11A executes the processes of S50 and the subsequent processes.

The processes of S50 and subsequent processes are the same as the processes of S50 and subsequent processes in the first embodiment, except that the process of S66 is executed in place of the process of S65 and except for the following points:

That is, in S55 of the first embodiment, the selection screen 21 is displayed on the operation panel 14 of the multifunction peripheral 1 and input of the user's selection of the button 22 or 23 is waited. Contrarily, in the present embodiment, the selection screen 21 is displayed on the display section 142 of the PC 1A, and input of the user's selection into the input device 141 is waited.

In S66, the control unit 11A executes the PC-side one page (FB) reading process shown in FIG. 6C. Also at this time, through execution of the resident process of FIG. 7 on the image scanner 1B side, the PC 1A acquires image data from the image scanner 1B.

[Advantages]

According to the thus configured image reading system 100, when a setting to output the first-format file (PDF file or TIFF file, in this example) is contained in the group of condition/format settings acquired in S11, first the reading process is executed in S21 or S46 onto the first group of reading targets (that is, one or more sheets that are set in the feeding tray 62 for the first time in the current reading process, or one sheet that is placed on the platen 56 for the first time in the current reading process).

Then, when an operation to continue the reading process is performed in the repeatedly-executed inquiry process of S30 or S55, the image reading system 100 repeatedly executes the reading process in S41 or S66, thereby scanning in succession the second and subsequent groups of reading targets (that is, sheets set in the feeding tray 62 for the second and subsequent times in the current reading process, or sheets placed on the platen 56 for the second and subsequent times in the current reading process). Image data obtained from the images in all the groups of reading targets through all of the executed reading processes of S21 and S41 or S46 and S66 are stored in the single first-format file. Thus, all the image data can be output as a single first-format file. The processes of executing S21 and executing S30 to S41 after affirmative determination in S25, and the processes of executing S46 and executing S55 to S66 after affirmative determination in S50 are examples of a first output process.

On the other hand, when a setting to output the second-format file (JPEG file, in this example) is contained in the condition/format settings acquired in S11, the reading processing is executed in S21 or S46 onto the first group of reading targets (that is, one or more sheets that are set in the feeding tray 62 for the first time in the current reading process, or one sheet that is placed on the platen 56 for the first time in the current reading process). As a result, one or more sets of image data, which is obtained from all of the one or more images in the first group of reading targets through the reading process of S21 or S46, is stored in the one or more second-format file in one-to-one correspondence with the scanned one or more image, without performing the inquiry processing of S30 or S55. Thus, second-format files as many as the number of the scanned images can be output.

Thus, unlike the case where the first-format file is output, the user need not respond to the inquiry processing, whereby operability in outputting the second-format file can be improved as compared to the case where the first-format file is output. The processing of executing S21 and advancing to the end of the routine after negative determination of S25, and the processing of executing S46 and advancing to the end of the routine after the negative determination of S50 are examples of a second output process.

In the above-described second embodiment, every time when the PC-side reading process shown in FIG. 5 is executed, the group of condition/format settings is acquired from the image scanner 1B in S11. However, the group of condition/format settings may be acquired from the image scanner 1B only once. That is, the group of condition/format settings may be acquired from the image scanner 1B only when the PC-side reading process of FIG. 5 is executed for the first time after the PC 1A is connected to the image scanner 1B to make up the image reading system 100. In this modification, the group of condition/format settings finally confirmed by the user and stored in the memory of the control unit 11A in S11 is retained in the memory (RAM or NVRAM, for example) of the control unit 11A even after the PC-side reading process shown in FIG. 5 is ended. When the PC-side reading process of FIG. 5 is executed again, the control unit 11A does not execute the process of S90 or S92 in the PC-side condition/format settings acquiring process of S11 (FIG. 6A), but executes only the processes of S94 and S96. That is, the control unit 11A does not transmit the request for the condition/format settings to the image scanner 1B, but merely displays the setting screen to show the settings that were confirmed by the user during the latest-executed PC-side reading process of FIG. 5 so that the user can update the condition/format settings.

While the description has been made in detail with reference to specific embodiments thereof, it would be apparent to those skilled in the art that various changes and modifications may be made therein without departing from the spirit and scope of the above described embodiments.

For example, the multifunction peripheral 1 of the first embodiment is described such that all the components necessary to attain the desired functions are provided in the multifunction peripheral 1. Similarly, the image reading system 100 of the second embodiment is described such that from among all the components necessary to attain the desired functions, some components are provided in the PC 1A and remaining components are provided in the image scanner 1B. However, it is possible to arbitrarily determine which components should be provided in which device as long as functions are not impaired. For example, in the second embodiment, in S30 and S55, the selection screen 21 may not be displayed on the display unit 142 of the PC 1A, but may be displayed on the operation panel 14 of the image scanner 1B.

Further, in each of the above-described embodiments, a function realized by one component may be realized by a plurality of components. Alternatively, in each of the embodiments, a plurality of functions realized by a plurality of components, respectively, or a prescribed function realized by cooperation of a plurality of components, may be realized by a single component. Further, at least part of the configuration in each embodiment may be replaced by a known configuration having the same function. Further, part of the configuration in each embodiment may be omitted. Further, at least part of the configuration in one embodiment may be added to the configuration in another embodiment, or at least part of the configuration in one embodiment may be replaced by at least part of the configuration in another embodiment.

In the embodiments, the PDF (Portable Document Format) file and the TIFF (Tagged Image File Format) file are examples of the first-format file. However, other than the PDF and TIFF, various format files can be used as the first-format file as long as these files can support the multiple-page format and therefore can store therein image data for a plurality of pages.

In the embodiments, the JPEG file is an example of the second-format file. However, other than the JPEG, various format files can be used as the second-format file as long as these files are unable to support the multiple-page format and therefore are unable to store image data for a plurality of pages, but are able to store image data for only one page.

What is claimed is:

1. An image reading apparatus comprising:
a conveyor defining a conveying path from a supply portion to a discharging position and configured to perform a conveying process onto a group of reading targets that is constituted by one or more reading targets mounted on the supply portion, the conveyor being configured to perform the conveying process by conveying the one or more reading targets in succession from the supply portion along the conveying path to the discharging position;
an image reader configured to perform a reading process to read an image from a reading target when the reading target is conveyed by the conveyor along the conveying path and to generate a set of image data representative of the read image, the image reader being configured to perform the reading process onto the group of reading targets such that when the one or more reading targets constituting the group of reading targets are conveyed in succession by the conveyor along the conveying path, the image reader generates a group of image data group of image data constituted by one or more sets of image data representative of one or more images read from the one or more reading targets; and
a processor configured to:
acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored;

control the conveyor to perform the conveying process onto a group of reading targets mounted on the supply portion and controlling the image reader to perform the reading process onto the group of reading targets to generate a group of image data;

judge whether the acquired information includes setting information indicating a setting to output the first format file or setting information indicating a setting to output the second format file;

execute a first output process when it is determined that the acquired information includes setting information indicating the setting to output the first format file; and execute a second output process when it is determined that the acquired information includes setting information indicating the setting to output the second format file, the processor being configured to execute the first output process by:

after the image reader has performed the reading process onto the group of reading targets, executing an inquiry to inquire of a user whether to continue reading;

every time an instruction to continue reading is received after having executed an inquiry, controlling the conveyor to perform the conveying process onto another group of reading targets that is newly mounted on the supply portion and controlling the image reader to perform the reading process onto the another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received, and the processor being configured to execute the second output process by:

outputting one or more second format files, whose number is equal to a number of one or more sets of image data that constitutes the group of image data generated through the reading process, each of the one or more sets of image data being stored in a corresponding second format file.

2. The image reading apparatus according to claim 1, further comprising an operating device configured to receive the instruction to continue reading and the instruction not to continue reading.

3. The image reading apparatus according to claim 1, wherein the first format file is either one of a PDF file and a TIFF file.

4. An image reading system comprising:

an image reading apparatus having an image reader, a conveyor, and a controller, the conveyor defining a conveying path from a supply portion to a discharging position and configured to perform a conveying process onto a group of reading targets that is constituted by one or more reading targets mounted on the supply portion, the conveyor being configured to perform the conveying process by conveying the one or more reading targets in succession from the supply portion along the conveying path to the discharging position, the image reader being configured to perform a reading process to read an image from a reading target when the reading target is conveyed by the conveyor along the conveying path and generate a set of image data representative of the read image, the image reader being configured to perform the reading process onto the group of reading targets such that when the one or more reading targets constituting the group of reading targets are conveyed in succession by the conveyor along the conveying path, the image reader generates a group of image data constituted by one or more sets of image data representative of one or more images read from the one or more reading targets; and an information processing apparatus having a processor configured to acquire image data generated by the image reader and to perform processing on the image data, the processor being configured to:

acquire information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored;

cooperate with the controller to control the conveyor to perform the conveying process onto a group of reading targets mounted on the supply portion and control the image reader to perform the reading process onto the group of reading targets to generate a group of image data;

judge whether the acquired information contains setting information indicating a setting to output the first format file or setting information indicating a setting to output the second format file;

execute a first output process when it is determined that the acquired information contains setting information indicating the setting to output the first format file; and execute a second output process when it is determined that the acquired information contains setting information indicating the setting to output the second format file, the processor being configured to execute the first output process by:

after the image reader has performed the reading process onto the group of reading targets, executing an inquiry to inquire of a user whether to continue reading;

every time an instruction to continue reading is received after having executed an inquiry, cooperating with the controller to control the conveyor to perform the conveying process onto another group of reading targets that is newly mounted on the supply portion and control the image reader to perform the reading process onto the another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received, and the processor being configured to execute the second output process by:

outputting one or more second format files, whose number is equal to a number of one or more sets of image data that constitutes the group of image data generated through the reading process, each of the one or more sets of image data being stored in a corresponding second format file.

5. The image reading system according to claim 4, wherein the first format file is either one of a PDF file and a TIFF file.

6. A non-transitory computer readable storage medium storing a set of program instructions for an image reading apparatus, the image reading apparatus including: a conveyor; an image reader; and a processor, the conveyor defining a conveying path from a supply portion to a discharging position and being configured to perform a conveying process onto a group of reading targets that is constituted by one or more reading targets mounted on the supply portion, the conveyor being configured to perform the conveying process by conveying the one or more reading targets in succession from the supply portion along the conveying path to the discharging position, the image reader being configured to perform a reading process to read an image from a reading target when the reading target is conveyed by the conveyor along the conveying path and to generate a set of image data representative of the read image, the image reader being configured to perform the reading process onto the group of reading targets such that when the one or more reading targets constituting the group of reading targets are conveyed in succession by the conveyor along the conveying path, the image reader generates a group of image data constituted by one or more sets of image data representative of one or more images read from the one or more reading targets, the program instructions, when executed by the processor, causing the image reading apparatus to perform:

acquiring information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored;

controlling the conveyor to perform the conveying process onto a group of reading targets mounted on the supply portion and controlling the image reader to perform the reading process onto the group of reading targets to generate a group of image data;

judging whether the acquired information contains setting information indicating a setting to output the first format file or setting information indicating a setting to output the second format file;

executing a first output process when it is determined that the acquired information contains setting information indicating the setting to output the first format file; and executing a second output process when it is determined that the acquired information contains setting information indicating the setting to output the second format file, the first output process including:

after the image reader has performed the reading process onto the group of reading targets, executing an inquiry to inquire a user on whether to continue reading;

every time an instruction to continue reading is received after having executed an inquiry, controlling the conveyor to perform the conveying process onto another group of reading targets that is newly mounted on the supply portion and controlling the image reader to perform the reading process onto the another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received, and the second output process including:

outputting one or more second format files, whose number is equal to a number of one or more sets of image data that constitutes the group of image data generated through the reading process, each of the one or more sets of image data being stored in a corresponding second format file.

7. The non-transitory computer readable storage medium according to claim 6, wherein the first format file is either one of a PDF file and a TIFF file.

8. A non-transitory computer readable storage medium storing a set of program instructions for an image reading system, the image reading system including:

an image reading apparatus having an image reader, a conveyor, and a controller; and an information processing apparatus having a processor, the conveyor defining a conveying path from a supply portion to a discharging position and configured to perform a conveying process onto a group of reading targets that is constituted by one or more reading targets mounted on the supply portion, the conveyor being configured to perform the conveying process by conveying the one or more reading targets in succession from the supply portion along the conveying path to the discharging position, the image reader being configured to perform a reading process to read an image from a reading target when the reading target is conveyed by the conveyor along the conveying path and generate a set of image data representative of the read image, the image reader being configured to perform the reading process onto the group of reading targets such that when the one or more reading targets constituting the group of reading targets are conveyed in succession by the conveyor along the conveying path, the image reader generates a group of image data constituted by one or more sets of image data representative of one or more images read from the one or more reading targets, the processor being configured to acquire image data generated by the image reader and to perform processing on the image data, the program instructions, when executed by the processor, causing the processor to perform:

acquiring information containing setting information indicating which of a first format file and a second format file to output as a file in which image data to be read by the image reader is to be stored, the first format file being defined as a file in which a plurality of sets of image data are able to be stored, the second format file being defined as a file in which a single set of image data is able to be stored;

cooperating with the controller to control the conveyor to perform the conveying process onto a group of reading targets mounted on the supply portion and control the image reader to perform the reading process onto the group of reading targets to generate a group of image data;

judging whether the acquired information contains setting information indicating a setting to output the first format file or setting information indicating a setting to output the second format file;

executing a first output process when it is determined that the acquired information contains setting information indicating the setting to output the first format file; and executing a second output process when it is determined that the acquired information contains setting information indicating the setting to output the second format file, the first output process including:

after the image reader has performed the reading process onto the group of reading targets, executing an inquiry to inquire of a user whether to continue reading;

every time an instruction is received to continue reading after having executed an inquiry, cooperating with the controller to control the conveyor to perform the conveying process onto another group of reading targets that is newly mounted on the supply portion and control the image reader to perform the reading process onto the another group of reading targets to generate another group of image data and executing the inquiry after the image reader has performed the reading process onto the another group of reading targets; and when receiving an instruction not to continue reading after having executed an inquiry, outputting a single first format file, in which is stored one or more sets of image data constituting one or more groups of image data, the one or more groups of image data being generated through the reading process that has been performed one or more times until the instruction not to continue reading is received, and the second output process including:

outputting one or more second format files, whose number is equal to a number of one or more sets of image data that constitutes the group of image data generated through the reading process, each of the one or more sets of image data being stored in a corresponding second format file.

9. The non-transitory computer readable storage medium according to claim 8, wherein the first format file is either one of a PDF file and a TIFF file.

* * * * *

UNITED STATES PATENT AND TRADEMARK OFFICE
CERTIFICATE OF CORRECTION

PATENT NO. : 9,672,455 B2  
APPLICATION NO. : 15/083597  
DATED : June 6, 2017  
INVENTOR(S) : Thanh Nguyenvan Page 1 of 1

It is certified that error appears in the above-identified patent and that said Letters Patent is hereby corrected as shown below:

In the Claims

In Column 20, Claim 1, Line 56:
Please delete "group of image data constituted" and insert --constituted--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*